Patented Aug. 14, 1951

2,564,130

UNITED STATES PATENT OFFICE 2,564,130

ONE-STEP BUTYL ALCOHOL PROCESS

Ralph C. Schreyer, New Castle, Del., assignor to
E. I. du Pont de Nemours & Company, Wilmington, Del., a corporation of Delaware No Drawing. Application July 24, 1948,
Serial No. 40,622

7 Claims. (Cl. 260—632)

This invention relates to improvements in the manufacture of n-butanol and isobutanol.

It has been disclosed heretofore that oxygen-containing organic compounds can be prepared by reaction between olefines, carbon monoxide and hydrogen in the presence of hydrogenation catalysts at elevated temperatures and pressures (U. S. patents 2,327,066 and 2,437,600; copending applications S. N. 636,262, now Patent No. 2,526,742 filed December 20, 1945 and S. N. 677,922, now Patent No. 2,473,995 filed June 19, 1946). It has also been disclosed (copending application S. N. 598,209, filed June 7, 1945) that organic oxygen-containing compounds, including aldehydes and compounds derivable therefrom, can be obtained by reacting an organic compound containing olefinic unsaturation with carbon monoxide and hydrogen under superatmospheric pressure at a temperature of 125° to 350° C. in the presence of a salt of cobalt or nickel, said salt being dissolved in the reaction mixture. In copending application S. N. 636,263, filed December 20, 1945, it has been disclosed that n-butanol and isobutanol can be prepared in good yield by reaction between propylene, CO, and $H_2$ at temperatures of 250° to 400° C. under pressures exceeding 300 atmospheres, in the presence of hydrogenation catalysts, the chief by-products being propane and certain esters; more particularly it has been found that butyl formate is produced in substantial quantity (ca. 10% conversion) in this previously disclosed process for manufacturing butanols from propylene, CO and $H_2$.

An object of this invention is to prepare n-butanol and isobutanol in improved yield from propylene, CO and $H_2$. Another object is to provide improvements in the manufacture of butanols from propylene, CO and $H_2$ whereby excessive hydrogenation of propylene, and conversion of propylene to ester (butyl formate), is avoided and an increased rate of production of butanols is obtained. Other objects of the invention appear hereinafter.

It has been discovered in accordance with this invention that n-butanol and isobutanol can be prepared in high yield by reaction between propylene, CO and $H_2$ at temperatures of 225° to 300° C. under superatmospheric pressures in the presence of a cobalt-containing catalyst, preferably a cobalt-containing catalyst which is dissolved in at least one of the ingredients of the reaction mixture, and preferably also in the presence of water. In a specific embodiment butyl formate, which, it has been discovered, is produced in the reaction between propylene, CO and $H_2$, is recovered and recycled to the reaction vessel. It has been discovered that by introducing about 10% to 15% of butyl formate (based upon the weight of propylene) with the propylene and water no additional butyl formate is produced in the reaction between propylene, CO and $H_2$ at the said temperatures and pressures.

The butyl formate which is, in general, recovered and recycled in the practice of the invention can be separated from the reaction product by any convenient method, preferably by distillation with water, which distillation yields a heterogeneous ternary azeotrope containing butyl formate, butanol and water. This azeotrope boils at a temperature of about 80° to 84° C. and contains about 69 to 76 weight percent of ester, 7% to 10% of alcohols, and 17% to 21% of water.

Any cobalt-containing catalyst may be employed in the practice of the invention. Cobalt salts of inorganic or organic acids are highly effective, e. g., cobalt chloride, cobalt sulfate, cobalt nitrate, cobalt acetate, cobalt propionate, cobalt isobutyrate, cobalt laurate, cobalt naphthenate, etc. It is desirable but not essential that the cobalt-containing catalyst employed in the practice of the invention be at least sparingly soluble in one of the ingredients of the reaction mixture, but insoluble catalysts, such as metallic cobalt or cobalt oxide may also be employed. Good results are obtained when the quantities of catalyst are as low as about 0.005% to about 5% based upon the weight of cobalt per unit weight of propylene charged, but larger amounts of catalyst may of course be used. Small amounts of organic or inorganic acid may be present, if desired; best results are obtained at a pH below 7, in general. The addition of acid to the reaction mixture, however, is not necessary, excellent results being obtained in the absence of added acid.

In specific embodiments it is frequently desirable to carry out the reaction between propylene, CO and $H_2$ continuously in such a manner that the reaction zone adjacent to the exit portion of the reactor is maintained at a higher temperature than the reaction zone adjacent to the inlet portion of the reactor.

In the synthesis of butanols from propylene, CO and $H_2$ in accordance with this invention the reaction pressure should be relatively high, best results being obtained at pressures in the range of about 350 to 1500 atmospheres or higher.

In general, it is desirable in the practice of the invention to employ an excess of both hydrogen and carbon monoxide. The mole ratio of $CO:H_2$ may be varied, but it is generally preferred that the mole ratio of $CO:H_2$ be initially from 3:1 to 1:3.

It has been discovered in accordance with the invention that water is necessary for high conversion and high yield of butanols. For example, in the absence of water relatively low conversions (40% to 45%) and relatively larger amounts of high boiling products (20% to 25%) were obtained. These difficulties cannot be avoided by lowering the reaction temperature, since at temperatures below about 225° C. substantial quantities of butyraldehydes are obtained.

Under the conditions described herein propylene is converted to n-butanol and isobutanol in yields exceeding about 80%, with complete consumption of the propylene, the chief by-product being propane which is produced to the extent of about 5% of the propylene charged. The mole ratio of n-butanol:isobutanol varies somewhat, and is frequently about 2:1.

The butanols which are produced in accordance with the invention may be separated from the crude reaction product by any convenient and suitable method such as by direct distillation. If desired, the distillation can be carried out at atmospheric pressure or under diminished pressure. In the embodiment in which a water-soluble cobalt compound is employed as catalyst the reaction product can be subjected to steam distillation and the aqueous portion of the distillation residue can be continuously recycled to the reaction vessel.

If desired, gaseous or liquid diluents may be employed in addition to the water which is required as a solvent, but in general these other diluents (e. g., benzene, dioxane, etc.) do not result in increased conversion of propylene to butanols. The effect of water as a diluent is very marked, however, as explained above. It is sometimes desirable to have in the reaction mixture a small quantity of an inorganic or organic acid, which has a somewhat beneficial effect on the yield of butanols, in certain instances.

The invention is illustrated further by means of the following examples:

*Example 1.*—A mixture containing 42 grams of propylene, 36 grams of water, 10 grams of butyl formate and 1 gram of finely divided cobalt metal was heated in a silver-lined shaker tube of 325 cc. capacity with carbon monoxide and hydrogen (mole ratio of $CO:H_2$ equals 1:1) at 249° to 255° C. for one hour under a pressure of 610 to 710 atmospheres. The resulting product was withdrawn from the reaction vessel and was freed of water by admixing with chloroform and distilling water in the form of a water-chloroform azeotrope until a non-aqueous distillate was obtained. The chloroform was then removed by distillation and the residue was distilled yielding 58 grams of material boiling in the range of 100° to 117° C. This fraction containing 9.8 grams of butyl formate, the remainder of the fraction being n-butanol and isobutanol. A small distillation heel remained. The chief reaction product other than n-butanol and isobutanol was propane which was formed by direct hydrogenation of the propylene which was initially present in the reaction mixture.

*Example 2.*—A mixture containing 42 grams of propylene, 18 grams of water, 1 gram of acetic acid and 1 gram of cobaltous acetate was heated for 1 hour with carbon monoxide and hydrogen (mole ratio of $CO:H_2$ equals 1:1) under a pressure of 690 to 705 atmospheres in a reaction vessel of 325 cc. capacity at a temperature of 245° to 250° C. The entire liquid product was distilled yielding about 62.6 grams of butanols, which corresponds to a conversion of 85% to 90% based on the propylene initially introduced. The chief by-products were butyl formate and propane.

*Example 3.*—A mixture containing 42 grams of propylene, 18 grams of water, 0.5 gram of sulfuric acid, 0.6 gram of acetic acid and 0.9 gram of cobaltous sulfate was heated with carbon monoxide and hydrogen (mole ratio of $CO:H_2$ equals 1:1) for 30 minutes at a temperature of 168° to 204° C., and thereafter for an additional 30 minutes at a temperature of 245° to 250° C. The pressure during the first heating stage was 250 to 550 atmospheres, and during the final heating stage was 650 to 700 atmospheres. The liquid product which was withdrawn from the reaction vessel weighed 88.1 grams, which corresponds to a weight increase of 26.1 grams (theory for complete conversion to butanols, 32 grams). The gaseous product was passed through dry ice traps, but virtually no condensate was formed, which indicated that there was very little, if any, hydrogenation of propylene to propane. The liquid product was distilled and analyzed for ester content, the results indicating that conversion to ester was only about 3 to 5%. There was virtually no liquid reaction product boiling below 80° C. This ester could be separated azeotropically (B. P. of azeotrope 80° to 84° C., containing 69% to 76% by weight of ester, 7% to 10% by weight of alcohols and 17% to 21% by weight of water) and recycled with propylene, water and catalyst as above described, to produce butanols in very high yield.

It is to be understood that the foregoing examples are illustrative only since many embodiments of the invention will occur to those who are skilled in the art. The process of the invention may be carried out either batchwise or continuously. If desired, very short reaction times may be employed; in fact, flash reactions are frequently obtained, which indicates that the reactants can be converted to butanols in an almost infinitesimally small reaction time if equipment limitations do not require a longer period in the reaction vessel. Relatively small quantities of catalyst (less than 0.05% by weight calculated as cobalt metal based on the propylene charged) may be employed without substantial decrease in rate of conversion, and in fact small quantities of catalyst (less than 1%) give somewhat better results than quantities in excess of about 2% based on the weight of propylene charged.

Since many different ways of practicing the invention will occur to those who are skilled in the art, it is to be understood that I do not limit myself except as set forth in the following claims.

I claim:

1. A process for preparing butanols which comprises introducing propylene, butyl formate, water, CO and $H_2$ into a reaction vessel, and carrying out the resulting reaction between the said propylene, CO and $H_2$ under superatmospheric pressure at a temperature of 225° to 300° C. in the presence of a cobalt-containing catalyst, whereby a reaction product containing n-butanol and isobutanol is obtained and the formation of additional amounts of butyl formate from propylene, CO and $H_2$ is suppressed by the butyl formate which has been introduced, and thereafter recovering n-butanol and isobutanol from the resulting mixture.

2. A process for preparing butanols which comprises reacting propylene with CO and $H_2$ under a pressure of 350 to 1500 atmospheres at a temperature of 225° to 300° C. in the presence of water and a compound of cobalt dissolved in at least one of the ingredients of the reaction mixture whereby a reaction product containing n-butanol, isobutanol and butyl formate is obtained, recovering the said butyl formate, recycling the said butyl formate to the reaction vessel and thereafter recovering n-butanol and isobutanol from the resulting mixture.

3. The process of claim 2 in which the said catalyst is cobalt acetate.

4. The process of claim 2 in which the initial mole ratio of $CO:H_2$ is from 3:1 to 1:3 inclusive.

5. The process of claim 2 in which the quantity of catalyst employed is 0.001% to 2.0% of the weight of propylene present initially.

6. In the process of making n-butanol and isobutanol from propylene, CO and hydrogen in the presence of a cobalt-containing catalyst, the step which comprises recovering butyl formate from the reaction product and recirculating the said butyl formate to the reaction vessel, whereby the formation of additional quantities of butyl formate is suppressed.

7. The process of claim 5 in which the said butyl formate is recovered as a ternary azeotrope of butyl formate, butanol and water.

RALPH C. SCHREYER.

REFERENCES CITED

The following references are of record in the file of this patent:

UNITED STATES PATENTS

| Number | Name | Date |
|---|---|---|
| 2,327,066 | Roelen | Aug. 17, 1943 |
| 2,403,524 | Hagemann | July 9, 1946 |
| 2,418,899 | Pevere et al. | Apr. 15, 1947 |

OTHER REFERENCES

Fiat Final Report No. 1000 PB–81383, December 26, 1947, pages 23 and 32.

Serial No. 373,703, Martin (A. P. C.), published July 13, 1943.